Patented Mar. 30, 1937

2,075,455

UNITED STATES PATENT OFFICE 2,075,455

COMPOUNDS OF THE DIBENZANTHRONE SERIES

Heinrich Neresheimer and Anton Vilsmeier, Ludwigshafen-on-the-Rhine, Germany, assignors to General Aniline Works, Inc., New York, N. Y., a corporation of Delaware No Drawing. Application May 2, 1935, Serial No. 19,530. In Germany May 4, 1934

2 Claims. (Cl. 260—61)

The present invention relates to nitro derivatives of the dibenzanthrone series.

We have found that new and valuable nitro derivatives of the dibenzanthrone series are obtained, usually in excellent yields, by the treatment of the Bz2.Bz2'-quinones of the dibenzanthrone series, which are obtainable for example by the action of pyrolusite in sulfuric acid on dibenzanthrone or 2.2'-dibenzanthronyl, with nitrating agents.

Instead of quinones of the dibenzanthrone series, the initial materials may be compounds which form quinones of the dibenzanthrone series under the reaction conditions, as for example dihydroxydibenzanthrones or suitable monohydroxydibenzanthrones or their ethers or esters with organic acids. Thus for example by the treatment of dibenzanthrone-Bz.2.Bz.2'-quinone, or of the dihydroxydibenzanthrone obtainable therefrom by reduction, or of its monomethyl or dimethyl ethers, or its diacetyl compound, or of its condensation product with formaldehyde or of Bz.2-monohydroxydibenzanthrone or of its methyl ether, with 90 per cent nitric acid at about 50° C. one and the same compound is obtained; this compound crystallizes in the form of red needles and, according to analysis, contains two nitro groups in the Bz3 and Bz3'-positions.

The following examples will further illustrate how the said invention may be carried out in practice, but the invention is not restricted to these examples. The parts are by weight.

Example 1

100 parts of dibenzanthrone-Bz.2.Bz.2'-quinone (obtainable according to Example 13 of the U. S. Patent No. 1,564,423) are introduced at about 50° C. into a mixture of 500 parts of glacial acetic acid and 750 parts of 98 per cent nitric acid. The whole is heated to from about 70° to 80° C. and kept at the said temperature while stirring until initial material can no longer be detected, which is the case after about an hour. The whole is then allowed to cool and is filtered by suction; the filter residue is washed with glacial acetic acid or 62 per cent nitric acid and then freed from adherent acid in the usual manner.

The reaction product forms red crystals, dissolves in concentrated sulfuric acid giving a bluish violet coloration, yields with pyridine a yellow-red solution. According to analysis and its properties the reaction product contains two nitro groups in the Bz3- and Bz3'-positions.

Example 2

100 parts of Bz.2.Bz.2'-dihydroxydibenzanthrone (obtainable according to Example 13 of the U. S. Patent No. 1,564,423 by reducing the oxidation product with sodium bisulfite) are introduced at room temperature into 2000 parts of about 90 per cent nitric acid. The dihydroxydibenzanthrone is thus immediately converted into the corresponding quinone, which crystallizes out in the form of yellow-brown needles. The whole is heated while stirring to from about 50° to 60° C. and kept at the said temperature until initial material can no longer be detected. The whole is then allowed to cool and is worked up as described in Example 1. The mother liquor may be re-employed several times for new batches. The reaction product, obtained in very good yields, is identical with the compound described in Example 1.

If, instead of the dihydroxydibenzanthrone, its alkylated derivatives, as for example dimethoxydibenzanthrone, hydroxymethoxydibenzanthrone or the like, be employed, or the condensation product derived from dihydroxydibenzanthrone and trioxymethylene according to the British Patent No. 206,638 be employed, the same final product is obtained.

Example 3

100 parts of Bz.2.Bz.2'-dihydroxydibenzanthrone are introduced at room temperature into a mixture of 1000 parts of nitrobenzene and 200 parts of 98 per cent nitric acid. The whole is then heated at from about 100° to 110° C. until initial material can no longer be detected. The whole is then allowed to cool and is worked up in the manner described in Example 1. The resulting reaction product is identical with the compound obtained according to Example 1.

Example 4

6.6' - dichlor - Bz.2.Bz.2' - dihydroxydibenzanthrone is nitrated in the manner described in Example 2, whereby a product containing chlorine and nitrogen is obtained which having regard to its method of formation and its properties is probably the 6.6'-dichloro derivative of the compound obtainable according to Example 1.

If 6-chlor-Bz2.Bz2'-dihydroxydibenzanthrone is employed as starting material, a compound having similar properties is obtained.

Example 5

100 parts of Bz.2.monohydroxydibenzanthrone are nitrated by treatment with 1500 parts of 90 per cent nitric acid at from 70° to 80° C. The reaction product, obtained in a good yield, is identical with the compound obtained according to Example 1.

What we claim is:—

1. Bz3.Bz3' - dinitrodibenzanthrone - Bz2.Bz2'-quinones selected from the class consisting of unsubstituted Bz3.Bz3' - dinitrodibenzanthrone-Bz2.Bz2'-quinones and the 6-chlor- and the 6.6'-dichlor derivatives thereof.

2. Bz3.Bz3' - dinitrodibenzanthrone - Bz2.Bz2'-quinone which is a red crystalline powder, dissolves in concentrated sulfuric acid giving a bluish violet coloration.

HEINRICH NERESHEIMER.
ANTON VILSMEIER.